(12) United States Patent
Hayashi et al.

(10) Patent No.: US 7,426,837 B2
(45) Date of Patent: Sep. 23, 2008

(54) REFRIGERATOR

(75) Inventors: Koji Hayashi, Settsu (JP); Kenji Kinokami, Settsu (JP); Toshiyuki Momono, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 450 days.

(21) Appl. No.: 10/556,818

(22) PCT Filed: May 13, 2004

(86) PCT No.: PCT/JP2004/006764

§ 371 (c)(1),
(2), (4) Date: Dec. 20, 2005

(87) PCT Pub. No.: WO2004/102086

PCT Pub. Date: Nov. 25, 2004

(65) Prior Publication Data

US 2007/0051119 A1   Mar. 8, 2007

(30) Foreign Application Priority Data

May 15, 2003   (JP) ............................. 2003-136941

(51) Int. Cl.
*F25B 39/04* (2006.01)
*F25B 41/00* (2006.01)
(52) U.S. Cl. ............................ 62/183; 62/184; 62/196.4
(58) Field of Classification Search ................... 62/181, 62/183, 184, 159, 196.4, 498
See application file for complete search history.

(56) References Cited

U.S. PATENT DOCUMENTS

2007/0006602 A1* 1/2007 Hayashi et al. ............... 62/190

FOREIGN PATENT DOCUMENTS

| JP | S56-7955 A | 1/1981 |
|---|---|---|
| JP | 60-45345 B2 | 10/1985 |
| JP | 7-239157 A | 9/1995 |
| JP | 2002-277098 A | 9/2002 |
| JP | 2003-74995 A | 3/2003 |

* cited by examiner

*Primary Examiner*—Marc E Norman
(74) *Attorney, Agent, or Firm*—Birch, Stewart, Kolasch & Birch, LLP

(57) ABSTRACT

A refrigerator includes a compressor compressing a refrigerant, a first liquid heat exchanger performing heat exchange between the refrigerant and a first liquid heat medium, an expander expanding the refrigerant, a second liquid heat exchanger performing heat exchange between the refrigerant and a second liquid heat medium, an air heat exchanger performing heat exchange between the refrigerant and air, a blower sending air to the air heat exchanger, a refrigerant flow rate regulator regulating a flow rate of the refrigerant of the first liquid heat exchanger, the second liquid heat exchanger and the air heat exchanger, a pressure sensor detecting a pressure value of the refrigerant of the air heat exchanger, a target pressure value setter setting a target pressure value of the refrigerant of the air heat exchanger in accordance with a target temperature value of the first liquid heat medium, and a blower controller controlling the blower so that the detection value of the pressure sensor becomes the target pressure value.

3 Claims, 2 Drawing Sheets

REFRIGERATOR

BACKGROUND OF THE INVENTION

The present invention relates to a refrigerator having a liquid heat exchanger and an air heat exchanger.

Conventionally, there has been a refrigerator for simultaneously feeding cold water and hot water, which is composed of a compressor for compressing a refrigerant, a hot water heat exchanger, an expander, a cold water heat exchanger and an air heat exchanger, with a three-way valve mounted on an outlet side of the compressor and a three-way valve mounted on an inlet side of the compressor (see JP S56-7955 A).

In the conventional refrigerator, when the cold water heat exchanger is larger in heat load than the hot water heat exchanger, the opening degree of the outlet-side three-way valve is regulated so as to communicate the outlet side of the compressor with the hot water heat exchanger and the air heat exchanger, while the opening degree of the inlet-side three-way valve is regulated so as to communicate the inlet side of the compressor with the cold water heat exchanger. Consequently, the air heat exchanger functions as a condenser, by which the heat load is balanced between the cold water heat exchanger having a relatively large heat load and the hot water heat exchanger having a relatively small heat load.

When the hot water heat exchanger is larger in heat load than the cold water heat exchanger, the opening degree of the outlet-side three-way valve is regulated so as to communicate the outlet side of the compressor only with the hot water heat exchanger, while the opening degree of the inlet-side three-way valve is regulated so as to communicate the inlet side of the compressor both with the cold water heat exchanger and the air heat exchanger. Consequently, the air heat exchanger functions as an evaporator, by which the heat load is balanced between the hot water heat exchanger having a relatively large heat load and the cold water heat exchanger having a relatively small heat load.

However, in the conventional refrigerator, when the air heat exchanger functions as a condenser, air used in air heat exchange is usually lower in temperature than hot water for heat exchange in the hot water heat exchanger, which makes condensing pressure of the refrigerant in the air heat exchanger lower than the condensing pressure of the refrigerant in the hot water heat exchanger. Therefore, since a flow rate of the refrigerant in the air heat exchanger becomes smaller than that of the refrigerant in the hot water heat exchanger, the refrigerant grows stagnant, i.e., the flooding phenomenon as it is called occurs. As a result, the conventional refrigerator suffers a problem that an amount of the refrigerant required to be retained in a refrigerant circuit is larger than that in a normal refrigerator having only a cold water heat exchanger and an air heat exchanger. For example, in the case where the hot water heat exchanger performs heat exchange using hot water with a temperature of about 45° C. at an outdoor temperature of −5° C., there is such a problem that the conventional refrigerator needs a refrigerant twice as much as the refrigerant used in the normal refrigerator.

Moreover, when the heat loads in the hot water heat exchanger and the cold water heat exchanger changes and the heat load of the hot water heat exchanger becomes larger than the heat load of the cold water heat exchanger, the outlet-side and inlet-side three-way valves are regulated so that the air heat exchanger which has been functioning as the condenser functions as an evaporator. In this case, a large amount of a liquid refrigerant stagnant in the air heat exchanger due to the flooding phenomenon may flow into the compressor, and may cause liquid back to the compressor, which may lead to breakdown.

SUMMARY OF THE INVENTION

An object of the present invention is to provide a refrigerator having an air heat exchanger in which the flooding phenomenon is less likely to occur.

In order to accomplish the object, a refrigerator according to a first aspect of the present invention includes:

a compressor compressing a refrigerant;

a first liquid heat exchanger performing heat exchange between the refrigerant and a first liquid heat medium;

an expander expanding the refrigerant;.

a second liquid heat exchanger performing heat exchange between the refrigerant and a second liquid heat medium;

an air heat exchanger performing heat exchange between the refrigerant and air;

a blower sending air to the air heat exchanger;

a refrigerant flow rate regulator regulating a flow rate of the refrigerant of the first liquid heat exchanger, the second liquid heat exchanger and the air heat exchanger;

a pressure sensor detecting a pressure value of the refrigerant of the air heat exchanger;

a target pressure value setter setting a target pressure value of the refrigerant of the air heat exchanger in accordance with a target temperature value of the first liquid heat medium; and a blower controller controlling the blower so that the detection value of the pressure sensor becomes the target pressure value.

According to this construction, the refrigerant compressed in the compressor circulates the first liquid heat exchanger, the expander and the second liquid heat exchanger in sequence since the flow rate of the refrigerant in each heat exchanger is regulated by the refrigerant flow rate regulator. In this case, the first liquid heat exchanger serves as a condenser to heat the first liquid heat medium, while the second liquid heat exchanger serves as an evaporator to cool the second liquid heat medium. Moreover, the flow rate of the refrigerant to the air heat exchanger is regulated by the refrigerant flow rate regulator so that the air heat exchanger serves as a condenser or as an evaporator. This balances the heat load between the first liquid heat exchanger and the second liquid heat exchanger. The target pressure value of the refrigerant of the air heat exchanger is set in accordance with the target temperature value of the first liquid heat medium by the target pressure value setter. Then, for example, the rotation speed and the operating number of fans in the blower are controlled by the blower controller so that the detection value from the pressure sensor becomes the target pressure value. This makes it possible to prevent the refrigerant pressure in the air heat exchanger from becoming considerably lower than the refrigerant pressure in the first liquid heat exchanger. In other words, the condensing pressure of the refrigerant in the air heat exchanger is prevented from becoming considerably lower than the condensing pressure of the refrigerant in the first liquid heat exchanger. Therefore, the refrigerant in the air heat exchanger is less likely to grow stagnant, and the so-called flooding phenomenon of the refrigerant becomes less likely to occur. As a result, the refrigerator can considerably reduce an amount of the refrigerant required to retain in a refrigerant circuit, and can also avoid the liquid back of the compressor.

Moreover, when, for example, the target temperature of the first liquid heat exchanger is relatively low, and so both the condensing pressures of the first liquid heat exchanger and the air heat exchanger may be low, appropriate increase in volume of air sent by the blower can reduce the refrigerant flow rate to the respective heat exchangers, which makes it possible to keep a refrigerant discharge amount from the compressor to the required minimum. Therefore, the refrigerator can effectively reduce power consumption of, for example, a motor which drives the compressor.

Moreover, since the refrigerant pressure in the air heat exchanger is regulated to be a pressure in accordance with the target temperature value of the first liquid heat medium, the discharge pressure of the compressor that feeds the refrigerant to the air heat exchanger has only to be a pressure compatible with the target temperature value of the first liquid heat medium. Therefore, in accordance with the target temperature value, for example, the discharge pressure of the compressor can be reduced from the discharge pressure in the case where the discharge pressure of the compressor is fixed to a discharge pressure in accordance with a maximum value of settable target temperature values of the first liquid heat medium. As a result, the power consumption of, for example, the motor that drives the compressor can effectively be reduced.

Moreover, the volume of air sent to the air heat exchanger is regulated so that the refrigerant of the air heat exchanger gains a target pressure value, and this prevents the refrigerant pressure in the air heat exchanger from becoming considerably lower than the refrigerant pressure in the first liquid heat exchanger, which in turn can reduce the refrigerant flow rate fed to the air heat exchanger to the required minimum. Therefore, the refrigerant flow rate regulator makes it possible to feed the refrigerant with a flow rate larger than the conventional flow rate to the first liquid heat exchanger which receives feed of the refrigerant together with the air heat exchanger, which allows the temperature of the first liquid heat medium to be controlled by the first liquid heat exchanger at higher accuracy than in the conventional refrigerator.

It is defined that in the present specification, the pressure of the refrigerant of the air heat exchanger refers to every one of the pressure of the refrigerant in the air heat exchanger, the pressure of the refrigerant in the vicinity of the inlet of the air heat exchanger, and the pressure of the refrigerant in the vicinity of the outlet of the air heat exchanger.

Moreover, the refrigerant flow rate regulator may be a three-way valve or a combination of a plurality of two-way valves.

In one embodiment, the refrigerator further includes:

a temperature sensor detecting a temperature value of the first liquid heat medium subjected to heat exchange with the refrigerant in the first liquid heat exchanger; and a target pressure value corrector correcting the target pressure value based on the detection value of the temperature sensor.

According to this embodiment, based on an actual temperature of the first liquid heat medium detected by the temperature sensor, the target pressure value of the refrigerant of the air heat exchanger is corrected. Consequently, in the air heat exchanger, considerable reduction in the condensing pressure of the refrigerant is reliably prevented in accordance with an actual condensing pressure of the refrigerant in the first liquid heat exchanger. As a result, the stagnation of the refrigerant in the air heat exchanger is effectively prevented so that the flooding phenomenon of the refrigerant is effectively prevented.

Moreover, since the pressure of the refrigerant in the air heat exchanger is regulated to be a pressure corresponding to an actual temperature of the first liquid heat medium, the discharge pressure of the compressor that feeds the refrigerant to the air heat exchanger has only to be a pressure compatible with the actual temperature of the first liquid heat medium. Therefore, the discharge pressure of the compressor can be reduced in accordance with the actual temperature of the first liquid heat medium, which allows effective reduction in power consumption of, for example, a motor that drives the compressor.

A refrigerator according to a second aspect of the present invention includes:

a compressor compressing a refrigerant;

a first liquid heat exchanger performing heat exchange between the refrigerant and a first liquid heat medium;

an expander expanding the refrigerant;

a second liquid heat exchanger performing heat exchange between the refrigerant and a second liquid heat medium;

an air heat exchanger performing heat exchange between the refrigerant and air;

a blower sending air to the air heat exchanger;

a refrigerant flow rate regulator regulating a flow rate of the refrigerant of the first liquid heat exchanger, the second liquid heat exchanger and the air heat exchanger;

a pressure sensor for detecting a pressure value of the refrigerant of the air heat exchanger;

a temperature sensor detecting a temperature value of the first liquid heat medium subjected to heat exchange with the refrigerant in the first liquid heat exchanger;

a target pressure value setter setting a target pressure value of the refrigerant of the air heat exchanger in accordance with the detected value of the temperature sensor; and a blower controller for controlling the blower so that the detection value of the pressure sensor becomes the target pressure value.

According to this construction, the refrigerant compressed in the compressor circulates the first liquid heat exchanger, the expander and the second liquid heat exchanger in sequence since the flow rate of the refrigerant in each heat exchanger is regulated by the refrigerant flow rate regulator. In this case, the first liquid heat exchanger serves as a condenser to heat the first liquid heat medium, while the second liquid heat exchanger serves as an evaporator to cool the second liquid heat medium. Moreover, the flow rate of the refrigerant to the air heat exchanger is regulated by the refrigerant flow rate regulator so that the air heat exchanger serves as a condenser or as an evaporator. This balances the heat load between the first liquid heat exchanger and the second liquid heat exchanger. The target pressure value of the refrigerant of the air heat exchanger is set by the target pressure value setter in accordance with the temperature value of the first liquid heat medium detected by the temperature sensor. Then, for example, the rotation speed and the operating number of fans in the blower are controlled by the blower controller so that the detection value from the pressure sensor becomes the target pressure value. This makes it possible to prevent the refrigerant pressure in the air heat exchanger from becoming considerably lower than the refrigerant pressure in the first liquid heat exchanger. In other words, the condensing pressure of the refrigerant in the air heat exchanger is prevented from becoming considerably lower than the condensing pressure of the refrigerant in the first liquid heat exchanger. Therefore, the refrigerant in the air heat exchanger is less likely to grow stagnant, and the so-called flooding phenomenon of the refrigerant becomes less likely to occur. As a result, the refrigerator can considerably reduce an amount of the refrigerant required to retain in a refrigerant circuit, and can also avoid the liquid back of the compressor.

Moreover, when, for example, the target temperature of the first liquid heat exchanger is relatively low, and so both the condensing pressures of the first liquid heat exchanger and the air heat exchanger may be low, appropriate increase in volume of air sent by the blower can reduce the refrigerant flow rate to the respective heat exchangers, which makes it possible to keep a refrigerant discharge amount from the compressor to the required minimum. Therefore, the refrigerator can effectively reduce power consumption of, for example, a motor which drives the compressor.

Moreover, since the refrigerant pressure in the air heat exchanger is regulated to be a pressure corresponding to an actual temperature of the first liquid heat medium, the discharge pressure of the compressor that feeds a refrigerant to the air heat exchanger has only to be a pressure compatible with the actual temperature of the first liquid heat medium. Therefore, the discharge pressure of the compressor can be reduced in accordance with the actual temperature of the first liquid heat medium, which allows effective reduction in power consumption of, for example, the motor that drives the compressor.

Moreover, the volume of air sent to the air heat exchanger is regulated so that the refrigerant of the air heat exchanger gains a target pressure value, and this prevents the refrigerant pressure in the air heat exchanger from becoming considerably lower than the refrigerant pressure in the first liquid heat exchanger, which in turn can reduce the refrigerant flow rate fed to the air heat exchanger to the required minimum. Therefore, the refrigerant flow rate regulator makes it possible to feed the refrigerant with a flow rate larger than the conventional flow rate to the first liquid heat exchanger which receives feed of the refrigerant together with the air heat exchanger, which allows the temperature of the first liquid heat medium to be controlled by the first liquid heat exchanger at higher accuracy than in the conventional refrigerator.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinbelow, the present invention will be described in detail in conjunction with the embodiment with reference to the drawings.

Figure 1:
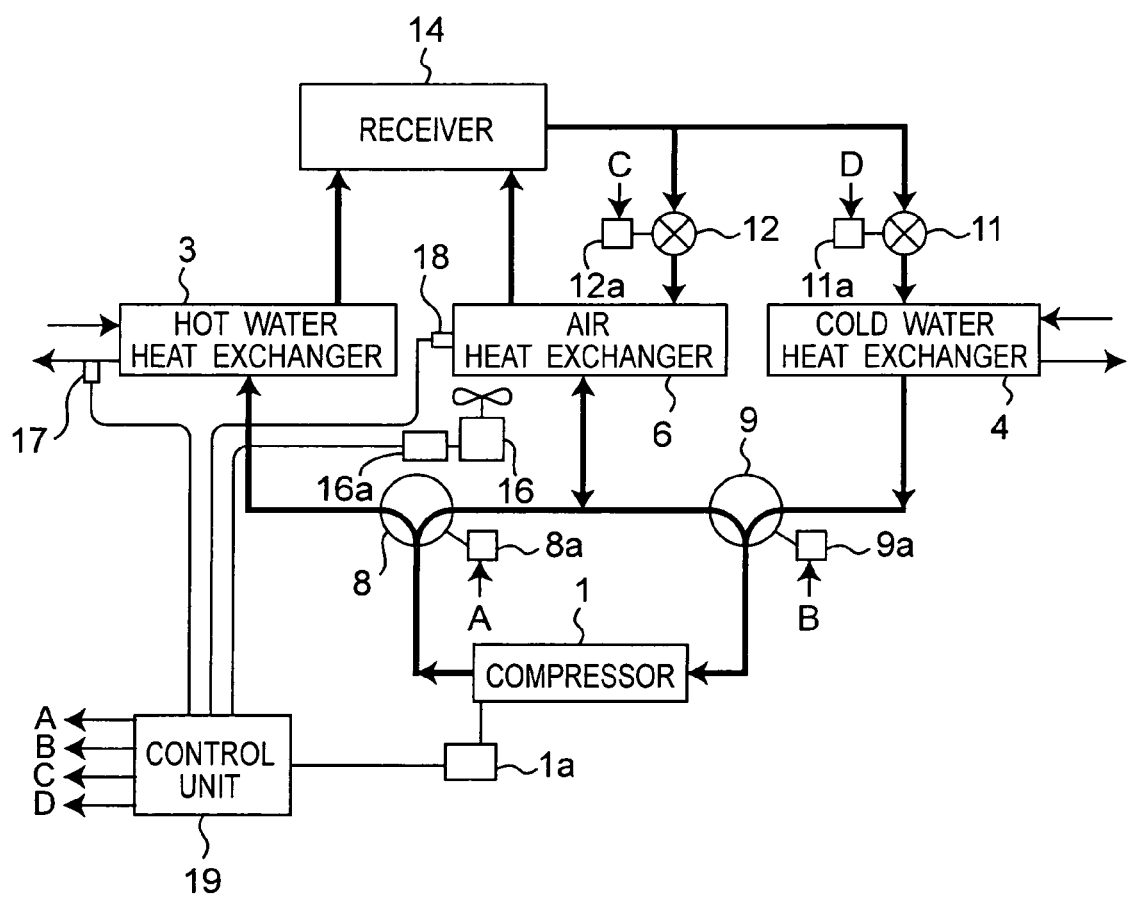
FIG. 1 is a schematic view showing a refrigerator in the embodiment of the present invention.

FIG. 1 is a schematic view showing a refrigerator in the embodiment of the present invention.

The refrigerator is a refrigerator for simultaneously feeding cold water and hot water, which includes a compressor 1 for compressing a refrigerant, a hot water heat exchanger, a hot water heat exchanger 3 serving as the first liquid heat exchanger, a cold water heat exchanger 4 serving as the second liquid heat exchanger, and an air heat exchanger 6. As the refrigerant, an HFC (hydrofluorocarbon) refrigerant such as R407C is used for example.

An outlet-side three-way valve 8 is connected to an outlet pipe of the compressor 1, and by changing the opening degree of the outlet-side three-way valve 8, a high-pressure refrigerant from the compressor 1 is fed to the hot water heat exchanger 3 and the air heat exchanger 6 in varied flow rate proportions. An inlet-side three-way valve 9 is connected to an inlet pipe of the compressor 1, and by changing the opening degree of the inlet-side three-way valve 9, a low-pressure refrigerant from the air heat exchanger 6 and a low-pressure refrigerant from the cold water heat exchanger 4 are fed to the compressor 1 in varied flow rate proportions. More particularly, the outlet-side three-way valve 8 and the inlet-side three-way valve 9 function as the refrigerant flow rate regulator.

The hot water heat exchanger 3 performs heat exchange between a high-temperature and high-pressure refrigerant from the compressor 1 and water serving as the first liquid heat medium to heat the water. The cold water heat exchanger 4 performs heat exchange between a low-temperature and low-pressure refrigerant expanded by a first electronic expansion valve 11 serving as the expander and water serving as the second liquid heat medium to cool the water.

The air heat exchanger 6 serves as a condenser or as an evaporator depending on the opening degrees of the outlet-side three-way valve 8 and the inlet-side three-way valve 9. When serving as the condenser, the air heat exchanger 6 is fed with a high-temperature and high-pressure refrigerant from the compressor 1 via the outlet-side three-way valve 8 to perform heat exchange between the refrigerant and air. The refrigerant subjected to heat exchange is led to a receiver 14 through a refrigerant pipe equipped with a check value. When serving as an evaporator, the air heat exchanger 6 is fed with the refrigerant, which was led to the receiver 14 from the hot water heat exchanger 3 and expanded and decompressed by a second electronic expansion valve 12 serving as the expander, to perform heat exchange between the refrigerant and air. The refrigerant subjected to heat exchange is sucked by the compressor 1 via the inlet-side three-way valve 9.

In the air heat exchanger 6, upon reception of air sent from a blower 16, the condensing pressure of an inside refrigerant is regulated. The blower 16 has a fan and an adjustable-speed motor, and by controlling the rotation speed of the adjustable-speed motor, the volume of air sent to the air heat exchanger 6 is controlled.

The refrigerator has a control unit 19 for controlling the operation of the refrigerator according to a target temperature of water heated by the hot water heat exchanger 3 and a target temperature of water cooled by the cold water heat exchanger 4. The control unit 19 is connected to a hot water temperature sensor 17 for detecting the temperature of water discharged from the hot water heat exchanger 3, a cold water temperature sensor for detecting the temperature of water discharged from the cold water heat exchanger 4, and a pressure sensor 18 for detecting the pressure of a refrigerant in the air heat exchanger 6, respectively. In response to a signal from each sensor, the control unit 19 controls the opening degree of the outlet-side three-way valve 8, the opening degree of the inlet-side three-way valve 9, the opening degree of the first electronic expansion valve 11, and the opening degree of the second electronic expansion valve 12.

More particularly, each of the outlet-side three-way valve 8 and the inlet-side three-way valve 9 has a housing having three ports, a valve disk housed in the housing for communicating two or all of three ports with each other, and a solenoid or a motor for driving the valve disk. The solenoid or the motor receives supply of driving power from power units 8a, 9a. In response to a signal from the control unit 19, the power units 8a, 9a changes power supply to the solenoid or the motor to control the position of the valve disk with respect to the housing. By this, the communication among the three ports and a flow rate of fluid among the communicated ports are controlled.

Moreover, each of the first and second electronic expansion valves 11, 12 has a needle valve, a fluid channel formed between an inlet port and an outlet port for housing the needle valve, and a solenoid for driving the needle valve forward and backward in axial direction. The solenoid receives supply of driving power from power units 11*a*, 12*a*. In response to a signal from the control unit 19, the power units 11*a*, 12*a* change power supply to the solenoid to control the position of the needle valve with respect to the fluid channel. By this, a distance between the outer peripheral surface of the needle value and the inner peripheral surface of the fluid channel is changed to control a difference in fluid pressure between the inlet port and the outlet port.

Moreover, the control unit 19 is connected to an inverter 1*a* for supplying driving power to the compressor 1, and by controlling the operating frequency of the inverter 1*a*, the frequency of power supplied from the inverter 1*a* to the motor of the compressor 1 is changed. By this, the rotation speed of the motor in the compressor 1 is controlled so that the rotation speed of a compression element driven by the motor is controlled, by which a refrigerant discharge amount from the compressor 1 is controlled.

Further, the control unit 19 is connected to an inverter 16*a* for supplying driving power to the blower 16, and by controlling the operating frequency of the inverter 16*a*, the frequency of power supplied from the inverter 16*a* to the motor of the blower 16 is changed. By this, the rotation speed of the motor in the blower 16 is controlled so that the rotation speed of a fan driven by the motor is controlled, by which the air volume sent from the blower 16 to the air heat exchanger 6 is controlled. More particularly, the control unit 19 serves also as the blower controller.

The control unit 19 operates mainly in five modes according to a target temperature and a heat load of the hot water heat exchanger 3 as well as a target temperature and a heat load of the cold water heat exchanger 4.

First, the first mode is a cooling exclusive mode, that is an operation mode for use in the case where a target temperature is set only in the cold water heat exchanger 4. In this mode, the opening degree of the outlet-side three-way valve 8 is so set that all part of the discharge refrigerant of the compressor 1 is fed to the air heat exchanger 6. Also, the opening degree of the inlet-side three-way valve 9 is so set that the refrigerant is fed to the compressor 1 only from the cold water heat exchanger 4. By this, a refrigerant cycle in which the refrigerant circulates the compressor 1, the air heat exchanger 6, the receiver 14, the first electronic expansion valve 11 and the cold water heat exchanger 4 is formed, with only the air heat exchanger 6 serving as a condenser while the cold water heat exchanger 4 performing only cooling of water.

The second mode is a cooling-oriented mode, that is an operation mode for use in the case where a target temperature is set both in the cold water heat exchanger 4 and the hot water heat exchanger 3, and the heat load of the cold water heat exchanger 4 is larger than the heat load of the hot water heat exchanger 3. In this mode, the opening degree of the outlet-side three-way valve 8 is so set that a discharge refrigerant from the compressor 1 is guided to the hot water heat exchanger 3 and the air heat exchanger 6 in specified proportions. Also, the opening degree of the inlet-side three-way valve 9 is so set that only the refrigerant from the cold water heat exchanger 4 is guided to the compressor 1. By this, both the hot water heat exchanger 3 and the air heat exchanger 6 serve as the condensers, and water is heated in the hot water heat exchanger 3 while water is cooled in the cold water heat exchanger 4. The opening degree of the outlet-side three-way valve 8 is regulated so that the heat load of the hot water heat exchanger 3 and the heat load of the cold water heat exchanger 4 are balanced in the air heat exchanger 6.

The third mode is a cooling heating equal mode, that is an operation mode for use in the case where a target temperature is set both in the cold water heat exchanger 4 and the hot water heat exchanger 3, and the heat load of the cold water heat exchanger 4 and the heat lead of the hot water heat exchanger 3 are almost equal. In this mode, the opening degree of the outlet-side three-way valve 8 is so set that all part of the discharge refrigerant of the compressor 1 is fed to the hot water heat exchanger 3. Also, the opening degree of the inlet-side three-way valve 9 is so set that only the refrigerant from the cold water heat exchanger 4 is guided to the compressor 1. By this, a refrigerant cycle in which the refrigerant circulates the compressor 1, the hot water heat exchanger 3, the receiver 14, the first electronic expansion valve 11 and the cold water heat exchanger 4 is formed, and water is heated in the hot water heat exchanger 3 while water is cooled in the cold water heat exchanger 4.

The fourth mode is a heating-oriented mode, that is an operation mode for use in the case where a target temperature is set both in the cold water heat exchanger 4 and the hot water heat exchanger 3, and the heat load of the cold water heat exchanger 4 is smaller than the heat load of the hot water heat exchanger 3. In this mode, the opening degree of the outlet-side three-way valve 8 is so set that all part of a discharge refrigerant from the compressor 1 is fed to the hot water heat exchanger 3. Also, the opening degree of the inlet-side three-way valve 9 is so set that a refrigerant from the air heat exchanger 6 and a refrigerant from the cold water heat exchanger 4 are guided to the compressor 1 in specified proportions. By this, both the cold water heat exchanger 4 and the air heat exchanger 6 serve as the evaporators. The opening degree of the inlet-side three-way valve 9 is regulated so that the heat load of the hot water heat exchanger 3 and the heat load of the cold water heat exchanger 4 are balanced in the air heat exchanger 6.

The fifth mode is a heating exclusive mode, that is an operation mode for use in the case where a target temperature is set only in the hot water heat exchanger 3. In this mode, the opening degree of the outlet-side three-way valve 8 is so set that all part of the discharge refrigerant of the compressor 1 is fed to the hot water heat exchanger 3. Also, the opening degree of the inlet-side three-way valve 9 is so set that the refrigerant is fed to the compressor 1 only from the air heat exchanger 6. By this, a refrigerant cycle in which the refrigerant circulates the compressor 1, the hot water heat exchanger 3, the receiver 14, the second electronic expansion valve 12 and the air heat exchanger 6 is formed, with only the air heat exchanger 6 serving as an evaporator while the hot water heat exchanger 3 performing only heating of water.

Figure 2:
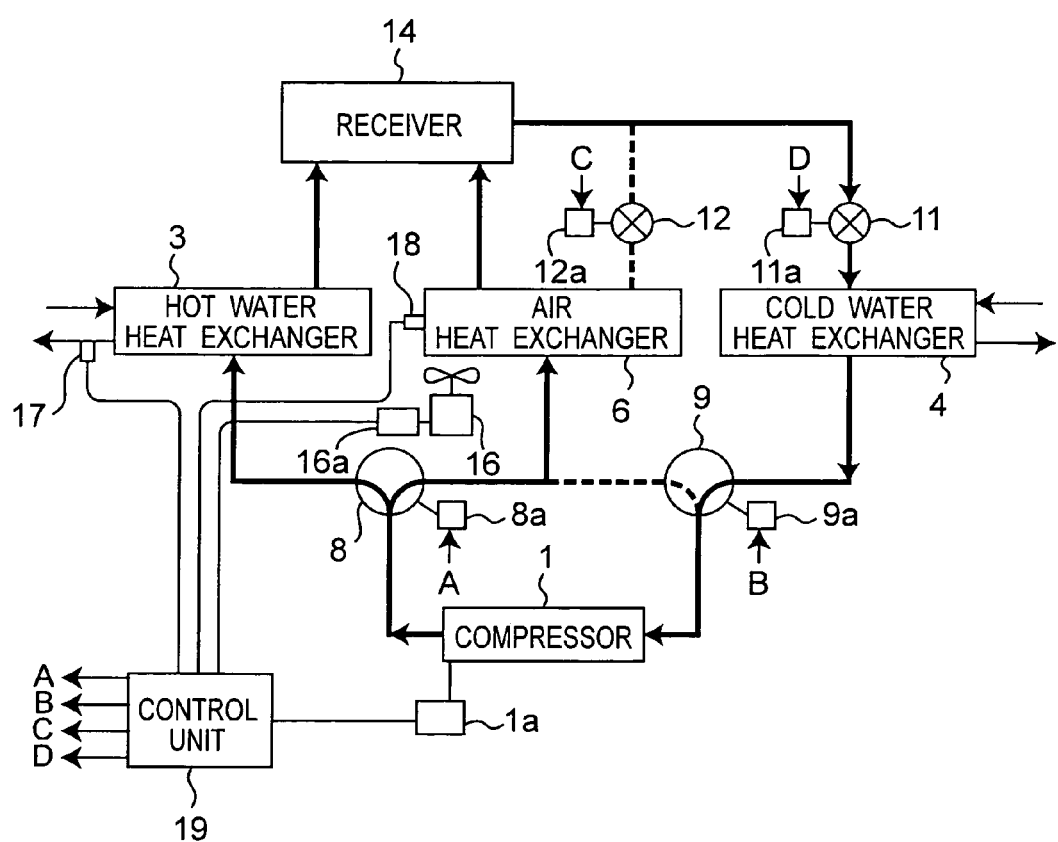
FIG. 2 is a view showing a refrigerant circuit when the refrigerator operates in cooling-oriented mode.

FIG. 2 is a view showing a refrigerant circuit formed in the refrigerator when the control unit 19 executes the cooling-oriented mode that is the second operation mode. In this cooling-oriented mode, a high-temperature and high-pressure refrigerant discharged from the compressor 1 diverges to the hot water heat exchanger 3 and the air heat exchanger 6 by the outlet-side three-way valve 8 for heating water in the hot water heat exchanger 3 and becoming cold and for being heat-exchanged with air in the air heat exchanger 6 and becoming cold, and then converges in the receiver 14. The refrigerant in the receiver 14 undergoes adiabatic expansion in the first electronic expansion valve 11 to become a low-temperature and low-pressure refrigerant, which cools water in the cold water heat exchanger 4 and becomes warm, before being sucked by the compressor 1.

In the cooling-oriented mode, when outside air temperature is relatively low and temperature of water fed to the hot water heat exchanger 3 is relatively high, the refrigerant pressure inside the air heat exchanger 6 becomes lower than the refrigerant pressure inside the hot water heat exchanger 3. Herein, the control unit 19 sets a target pressure value Ps of the refrigerant of the air heat exchanger 6 in accordance with a target temperature value Ts of water subjected to heat exchange in the hot water heat exchanger 3. Thus the control unit 19 serves as the target pressure value setter. Then, the control unit 19 regulates the rotation speed of a motor of the blower 16 so that a detected value Pm of the refrigerant pressure in the air heat exchanger 6 detected by the pressure sensor 18 approximates the target pressure value Ps. By this, the volume of air sent to the air heat exchanger 6 by the fan of the blower 16 is regulated so as to reduce a difference between the refrigerant pressure in the air heat exchanger 6 and the refrigerant pressure in the hot water heat exchanger 3. This makes it possible to avoid the refrigerant pressure in the air heat exchanger 6 becoming considerably lower than refrigerant pressure in the hot water heat exchanger 3. As a result, it becomes possible to effectively prevent the flooding phenomenon of the refrigerant caused, as shown in the conventional example, when a refrigerant is stagnant in the air heat exchanger 6 in which the condensing pressure has considerably decreased.

Moreover, since the refrigerator can prevent the flooding phenomenon of the refrigerant in the air heat exchanger 6, an amount of the refrigerant required to be retained in a refrigerant circuit can considerably be reduced from the conventional amount. Further, it becomes possible to effectively prevent the disadvantage, that is when the refrigerator is switched from the cooling-oriented mode to the heating-oriented mode, the liquid refrigerant stagnant in the air heat exchanger 6 flows into the compressor 1 and causes liquid back to the compressor, which leads to breakdown.

Further, the refrigerator variably sets the target pressure Ps of the refrigerant in the air heat exchanger in accordance with the target temperature Ts of the hot water heat exchanger 3. Therefore when, for example, the target temperature Ts is relatively low and both the condensing pressures of the hot water heat exchanger 3 and the air heat exchanger 6 can be low, the volume of air sent by the blower 16 can appropriately be increased, as a result of which the refrigerant discharge amount of the compressor 1 can be kept to the required minimum. Therefore, the refrigerator can effectively reduce the power consumption of the motor of the compressor 1. The power consumption of the compressor 1 can considerably be reduced from the power consumption in the case where, for example, the target pressure Ps of the air heat exchanger 6 is fixedly set at relatively high values in accordance with the condensing pressure obtained in the case of a maximum target temperature Ts which provides a maximum load to the hot water heat exchanger 3.

Moreover, since the refrigerant pressure in the air heat exchanger 6 is regulated to be a pressure in accordance with the target temperature Ts of the hot water heat exchanger 3, the discharge pressure of the compressor 1 that feeds the refrigerant to the air heat exchanger 6 has only to be a pressure compatible with the target temperature Ts of the hot water heat exchanger 3. Therefore, it is not necessary to fix the discharge pressure of the compressor to the discharge pressure corresponding to a maximum value of settable target temperatures of the hot water heat exchanger. As a result, the refrigerator in this embodiment can keep the discharge pressure of the compressor 1 to the required minimum in accordance with the target temperature Ts, which allows considerable reduction in power consumption of the motor of the compressor 1.

Moreover, the volume of air sent by the blower 16 is regulated so that the refrigerant of the air heat exchanger 6 gains the target pressure Ps, and this prevents the refrigerant pressure in the air heat exchanger 6 from becoming considerably lower than the refrigerant pressure in the hot water heat exchanger 3, which in turn can reduce the refrigerant flow rate fed to the air heat exchanger 6 to the required minimum. Therefore, it becomes possible to feed the refrigerant with a flow rate larger than the conventional flow rate to the hot water heat exchanger 3 which receives feed of the refrigerant together with the air heat exchanger 6 by the outlet-side three-way valve 8. As a result, the temperature of water can be controlled by the hot water heat exchanger 3 at higher accuracy than in conventional refrigerator.

Although in this embodiment, the control unit 19 sets the target pressure value Ps of the refrigerant of the air heat exchanger 6 in accordance with the target temperature value Ts of water subjected to heat exchange in the hot water heat exchanger 3, the target temperature Ts may be corrected based on the detected value Tm of the hot water temperature sensor 17. Consequently, in the case where, for example, the heat load of the hot water heat exchanger 3 has changed, the pressure of the air heat exchanger 6 can appropriately be controlled based on an actual condensing pressure of the hot water heat exchanger 3. As a result, a difference in condensing pressure between the hot water heat exchanger 3 and the air heat exchanger 6 can effectively be reduced, and the flooding phenomenon of the refrigerant in the air heat exchanger 6 can be prevented stably and reliably. Moreover, the power consumption of the compressor 1 can effectively be reduced.

Although in this embodiment, the control unit 19 sets the target pressure value Ps of the refrigerant of the air heat exchanger 6 in accordance with the target temperature value Ts of water subjected to heat exchange in the hot water heat exchanger 3, the target pressure value Ps may be set in accordance with the detected value Tm of the hot water temperature sensor 17. With this, the pressure of the air heat exchanger 6 can appropriately be controlled based on an actual heat load of the hot water heat exchanger 3. As a result, a difference in condensing pressure between the hot water heat exchanger 3 and the air heat exchanger 6 can effectively be reduced, and the flooding phenomenon of the refrigerant in the air heat exchanger 6 can be prevented stably and reliably. Moreover, the discharge pressure of the compressor 1 can be reduced to a required minimum discharge pressure, which is the pressure compatible with an actual heat load of the hot water heat exchanger 3, and therefore the power consumption of the compressor 1 can effectively be reduced.

In this embodiment, the outlet-side three-way valve 8 and the inlet-side three-way valve 9 can be three-way valves of any types as long as the valves have a function to communicate one port with the remaining two ports by changing the opening degree. Also, a plurality of selector valves and the like can be combined so as to fulfill the same function as the three-way valve.

Although in this embodiment, water has been used as the first liquid heat medium and the second liquid heat medium, mediums other than water, e.g., brines such as ethylene glycol-based liquids, may be applied to one of or both the first liquid heat medium and the second liquid heat medium.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A refrigerator comprising:
a compressor compressing a refrigerant;
a first liquid heat exchanger performing heat exchange between the refrigerant and a first liquid heat medium;
an expander expanding the refrigerant;
a second liquid heat exchanger performing heat exchange between the refrigerant and a second liquid heat medium;
an air heat exchanger performing heat exchange between the refrigerant and air;
a blower sending air to the air heat exchanger;
a refrigerant flow rate regulator regulating a flow rate of the refrigerant of the first liquid heat exchanger, the second liquid heat exchanger and the air heat exchanger;
a pressure sensor detecting a pressure value of the refrigerant of the air heat exchanger;
a target pressure value setter setting a target pressure value of the refrigerant of the air heat exchanger in accordance with a target temperature value of the first liquid heat medium; and
a blower controller controlling the blower so that the detection value of the pressure sensor becomes the target pressure value.

2. The refrigerator as defined in claim 1, further comprising:
a temperature sensor detecting a temperature value of the first liquid heat medium subjected to heat exchange with the refrigerant in the first liquid heat exchanger; and
a target pressure value corrector correcting the target pressure value based on the detection value of the temperature sensor.

3. A refrigerator comprising:
a compressor compressing a refrigerant;
a first liquid heat exchanger performing heat exchange between the refrigerant and a first liquid heat medium;
an expander expanding the refrigerant;
a second liquid heat exchanger performing heat exchange between the refrigerant and a second liquid heat medium;
an air heat exchanger performing heat exchange between the refrigerant and air;
a blower sending air to the air heat exchanger;
a refrigerant flow rate regulator regulating a flow rate of the refrigerant of the first liquid heat exchanger, the second liquid heat exchanger and the air heat exchanger;
a pressure sensor for detecting a pressure value of the refrigerant of the air heat exchanger;
a temperature sensor detecting a temperature value of the first liquid heat medium subjected to heat exchange with the refrigerant in the first liquid heat exchanger;
a target pressure value setter setting a target pressure value of the refrigerant of the air heat exchanger in accordance with the detected value of the temperature sensor; and
a blower controller for controlling the blower so that the detection value of the pressure sensor becomes the target pressure value.

* * * * *